United States Patent [19]

Krueger et al.

[11] Patent Number: 5,258,418
[45] Date of Patent: Nov. 2, 1993

[54] LOW DENSITY, WATER-BLOWN, RIGID POLYURETHANE FOAMS HAVING GOOD PHYSICAL PROPERTIES AND IMPROVED INITIAL SURFACE FRIABILITY

[75] Inventors: David C. Krueger, Grosse Ile; Thomas B. Lee, Southgate, both of Mich.

[73] Assignee: BASF Corporation, Parsippany, N.J.

[21] Appl. No.: 53,585

[22] Filed: Apr. 27, 1993

Related U.S. Application Data

[62] Division of Ser. No. 985,720, Dec. 4, 1992.

[51] Int. Cl.$^5$ ............................................. C08G 18/50
[52] U.S. Cl. .................................. 521/164; 521/167; 521/174
[58] Field of Search .................... 521/167, 174, 164

[56] References Cited

U.S. PATENT DOCUMENTS 4,410,641 10/1983 Narayan et al. ..................... 521/167
4,904,707 2/1990 Lunney ............................... 521/164

Primary Examiner—Morton Foelak
Attorney, Agent, or Firm—William G. Conger

[57] ABSTRACT

The present invention relates to low density, water-blown, rigid foams with good physical properties made with blends of toluenediamine (TDA)/glycerine initiated polyols. The foams made using these blends exhibit no initial surface friability. Further, it was found that specific blends of lower hydroxyl number polyols could be used, thereby reducing isocyanate consumption without affecting the physical properties of the foam.

5 Claims, No Drawings

LOW DENSITY, WATER-BLOWN, RIGID POLYURETHANE FOAMS HAVING GOOD PHYSICAL PROPERTIES AND IMPROVED INITIAL SURFACE FRIABILITY

This is a division, of application Ser. No. 07/985,720 filed Dec. 4, 1992.

The present invention is directed to low density, substantially closed-cell, water-blown, rigid polyurethane foams. These foams exhibit no initial surface friability and have an overall friability, as measured by ASTM C-421 (tumbling friability), of less than 9 weight percent. The foams of the present invention also exhibit good dimensional stability, as measured by ASTM D2126, generally less than 10 percent loss in volume.

1. BACKGROUND OF THE INVENTION

Low density, substantially closed-cell, rigid polyurethane foams utilizing water as a blowing agent and TDA-initiated polyols are known in the art. However, in the part when preparing these foams one skilled in the art was aware that there was a trade-off between physical characteristics. If dimensional stability was considered paramount, non-friability was sacrificed to some extent and vice versa. In some instances, a foam formulation would exhibit both good dimensional stability and friability characteristics after being allowed to cure for periods of 24 hours or more. The foams exhibiting the long cure time are undesirable from a production standpoint. It is the object of this invention to develop low density, substantially closed-cell, water-blown foams that exhibit good physical properties without extended cure times. It was found that foams having these characteristics could be produced with TDA polyols having relatively low hydroxyl numbers, but greater than 220, thereby reducing isocyanate consumption.

The combination of TDA and glycerine polyol blends reacted with polymethylene polyphenyl-polyisocyanates (polymeric-MDI) to make low density, substantially closed-cell, water-blown foams with generally good physical properties is known. The object of the present invention was to develop foam formulations with improved initial surface friability while retaining good physical properties. It was found that these objectives could be obtained using TDA-initiated polyether polyols having hydroxyl numbers greater than 220, thereby reducing overall isocyanate consumption.

2. DETAILED SUMMARY OF THE INVENTION

The low density, substantially closed-cell, water-blown polyurethane foams of the present invention comprise:

A. a polymethylene polyphenylpolyisocyanate,
B. a polyol blend, comprising;
  1. from 40 percent by weight to 100 percent by weight on the total weight of the blend of a toluenediamine-initiated polyether polyol having a hydroxyl number greater than 220 and less than or equal to about 390, and,
  2. from 0 percent by weight to 60 percent by weight, based on the total weight of the blend, of a polyether polyol having an average functionality of about 3 and a hydroxyl number from about 230 to about 1,000,
C. a catalyst capable of promoting urethane formation,
D. a surfactant,
E. water in an amount sufficient to act as a blowing agent, and
F. optionally dyes, fillers, flame retardants, stabilizers and the like.

These foams exhibit no initial friability, have a total (tumbling) friability of less than 9 weight percent, and excellent dimensional stability of less than 10 percent loss in volume. The foams are substantially closed-cell, typically having between 80 percent and 90 percent closed-cell content.

The isocyanates of the present invention include those isocyanates commonly included in the group referred to as polymeric-MDI. Polymeric-MDI represents a variety of products obtained by phosgenating diaminodiphenylmethane (MDA). Depending on reaction conditions, polymeric-MDI contains varying amounts of isomeric diphenylmethane diisocyanates and three-ring, four-ring, and greater than four-ring oligomers. In general, any commercial polymeric-MDI having an isocyanate content of about 31 weight percent and a functionality greater than 2 may be used. Examples include PAPI 27 from Dow, MONDUR MR from Miles, or LUPRANATE TM M20S from BASF. Preferred is the M20S which has an isocyanate content of about 31.4, functionality of 2.7, and a viscosity at 25° C. of 200 cps.

The polyol blend used in the present invention contains from 40 weight percent to 100 weight percent, based on the total weight of the blend, of a toluenediamine-initiated polyether polyol and up to 60 weight percent of another polyether polyol having an average functionality of about 3. The above-mentioned polyether polyols are produced in accordance with well-known methods by reacting one or more alkylene oxides with 2 to 4 carbons in the alkylene radical with the initiator molecule. Toluenediamine (TDA) must be the initiator for the polyol comprising 40 weight percent to 100 weight percent of the blend. Minor amounts of other initiators may be present. While the alkylene oxide adduct of the TDA may consist of various combinations of block and/or heteric copolymers of suitable alkylene oxides, a TDA-initiated propylene oxide homopolymer is preferred. The TDA polyether polyols used in the invention have a hydroxyl number greater than 220 to about 390. The preferred polyol is a polyoxypropylene adduct of TDA having a hydroxyl of about 275.

The other portion of the polyol blend comprising from 0 weight percent to about 60 weight percent is a polyoxyalkylene adduct of a tri-functional initiator, examples of which include glycerine and monoethanolamine. The preferred initiator is glycerine. As with the TDA-initiated polyether polyol, the tri-functional polyether may consist of various combinations of block and/or heteric copolymers; however, a glycerine-initiated polyoxypropylene homopolymer having a hydroxyl from 230 to about 1,000 is preferred.

Any suitable catalyst or mixture of catalysts may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine,N,N,N-trimethylisopropyl-propylenediamine,3-diethylaminopropyldiethylamine, dimethylbenzylamine, and the like. Other suitable catalysts are, for example, stannous chloride, dibutyltin-di-2-ethyl hexanoate, potassium hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particular desirable. Other surface-active agents which are operative, although not preferred, include polyethylene glycol ethers of long chain alcohols, tertiary amine or alkanol amine salts of long chain alkyl acid sulfate esters, alkyl sulfonic esters, and alkyl arylsulfonic acids.

Water was used as the sole blowing agent. The amount used varied according to the desired density of the foam.

Other optional additives which fall within the spirit of the present invention include known pigments, such as carbon black, dyes, stabilizers against aging and weathering, fungistats, bacteriostats, fillers, or flame retarding agents.

If desired, flame retardants may be incorporated in the foams. Among the flame retardants which may be employed ar pentabromodiphenyl oxide, dibromopropanol, tris($\beta$-chloropropyl)-phosphate, 2,2-bis(-bromoethyl) 1,3-propanediol, tetrakis(2-chloroethyl)ethylene diphosphate, tris(2,3-dibromopropyl)phosphate, tris($\beta$-chloroethyl)phosphate, tris(1,2-dichloropropyl)phosphate, bis-(2-chloroethyl)2-chloroethylphosphonate, molybdenum trioxide, ammonium molybdate, ammonium phosphate, pentabromodiphenyl oxide, tricresylphosphate, hexabromocyclododecane and dibromoethyl dibromocyclohexane.

The following examples serve to illustrate the invention and should not be construed as limiting in nature. All amounts given are in parts by weight unless otherwise indicated. The foam formulations are given in Table 1. The catalyst level for each foam was adjusted to give an ~40 second gel (string) time. For this series, the weight percent level of total water in the foam was set to 2 weight percent. The resins were blended and allow to de-gas. Free rise foams were made in #10 Lily cups to determine free rise densities. The surface friability of the cup foams were checked ~2 hrs. and ~24 hrs. after foaming. Foams were then molded in a 4"×10"×10" cardboard-lined mold at room temperature (~74° F.). The target density was 2.1 pcf. The foams were demolded after 10 to 15 minutes and submitted to testing. Testing data are listed in Table 2.

Polyol A is a toluenediamine/dipropylene glycol coinitiated polyoxyethylene-polyoxypropylene block copolymer having a hydroxyl number of about 450 and a molecular weight of 471.

Polyol B is a toluenediamine initiated polyoxyethylene-polyoxypropylene copolymer having a hydroxyl number of about 390 and a molecular weight of 569.

Polyol C is a toluenediamine initiated polyoxypropylene polymer having a hydroxyl number of about 275 and a molecular weight of 805.

Polyol D is a toluenediamine initiated polyoxypropylene polymer having a hydroxyl number of about 220 and a molecular weight of about 1,000.

Polyol E is a toluenediamine/ethylenediamine coinitiated polyoxyethylene-polyoxypropylene block copolymer having a hydroxyl number of about 300 and a molecular weight of 740.

Polyol F is a glycerine initiated polyoxypropylene polymer having a hydroxyl number of about 935 and a molecular weight of about 180.

Polyol G is a glycerine initiated polyoxypropylene polymer having a hydroxyl number of 398 and a molecular weight of 422.

Polyol H is a glycerine initiated polyoxypropylene polymer having a hydroxyl number of 230 and a molecular weight of 730.

Polyol I is a glycerine initiated polyoxypropylene polymer having a hydroxyl number of 57 and a molecular weight of 2,637.

Polyol J is a monoethanolamine initiated polyoxypropylene-polyoxyethylene block copolymer having a hydroxyl number 500 and a molecular weight of 334.

DC-193 is a silicone surfactant available from Dow.

Polycat 8 is an amine catalyst available from Air Products ("DMCHA").

Test Methods

Friability % (Total): ASTM C-421

Dimensional Stability: ASTM D-2126

TABLE 1

| COMPONENTS | OH. NO. | 1 | 2 | 3 | 4 | 5 | 6 |
| --- | --- | --- | --- | --- | --- | --- | --- |
| POLYOL A | 450 | 50 | 50 | 50 | 50 | | |
| POLYOL B | 390 | | | | | 50 | 50 |
| POLYOL C | 275 | | | | | | |
| POLYOL D | 220 | • | | | | | |
| POLYOL E | 300 | | | | | | |
| POLYOL F | 935 | | 10 | 20 | | 10 | 15 |
| POLYOL G | 400 | 50 | | | 40 | 40 | |
| POLYOL H | 240 | | 40 | | | | 35 |
| POLYOL I | 38 | | | 30 | | | |
| POLYOL J | 500 | | | | 10 | | |
| DC-193 | | 1 | 1 | 1 | 1 | 1 | 1 |
| POLYCAT 8 | | 1.8 | 1.6 | 0 | 1.5 | 2.2 | 1.8 |
| WATER | | 6.52 | 6.44 | 6.55 | 6.60 | 6.71 | 6.47 |
| TOTAL | | 109.32 | 109.04 | 107.55 | 109.10 | 109.91 | 109.27 |
| AVE. OH NO. | | 425 | 415 | 429 | 435 | 449 | 419 |
| INDEX | | 110 | 110 | 110 | 110 | 110 | 110 |
| LUPRANATE M20S | 133.4 | 217.5 | 213.3 | 219.2 | 221.4 | 226.7 | 215.2 |
| FRIABILITY | | | | | | | |
| INITIAL | | SLIGHT | SLIGHT | ** | SLIGHT | NONE | NONE |
| 24 HR. | | NONE | NONE | ** | NONE | NONE | NONE |
| SHRINKAGE | | SLIGHT | SLIGHT | ** | SLIGHT | SLIGHT | SLIGHT |
| #10 LILY CUP, PCF | | 1.53 | 1.54 | ** | 1.50 | 1.52 | 1.52 |
| CORE, PCF | | 1.35 | 1.37 | ** | 1.29 | 1.24 | 1.22 |

TABLE 1-continued

| | | | | | | | |
|---|---|---|---|---|---|---|---|
| 10 × 10 × 4 PANEL, PCF | | 2.07 | 2.14 | ** | 2.25 | 2.19 | 2.17 |

| COMPONENTS | OH. NO. | 7 | 8 | 9 | 10 | 11 | 12 |
|---|---|---|---|---|---|---|---|
| POLYOL A | 450 | | | | | | |
| POLYOL B | 390 | 50 | 50 | | | | |
| POLYOL C | 275 | | | | | 100 | 70 |
| POLYOL D | 220 | | | | | | |
| POLYOL E | 300 | | | 75 | 100 | | |
| POLYOL F | 935 | 25 | 10 | 25 | | | 30 |
| POLYOL G | 400 | | 30 | | | | |
| POLYOL H | 240 | | | | | | |
| POLYOL I | 38 | 25 | | | | | |
| POLYOL J | 500 | | 10 | | | | |
| DC-193 | | 1 | 1 | 1.5 | 2 | 1.5 | 1.5 |
| POLYCAT 8 | | 0 | 1.8 | 1.8 | 1.2 | 2.2 | 2.2 |
| WATER | | 6.67 | 6.79 | 6.79 | 5.52 | 5.32 | 6.90 |
| TOTAL | | 107.67 | 109.59 | 110.09 | 108.72 | 109.02 | 110.60 |
| AVE. OH NO. | | 443 | 459 | 459 | 300 | 275 | 473 |
| INDEX | | 110 | 110 | 110 | 110 | 110 | 110 |
| LUPRANATE M20S | 133.4 | 224.6 | 230.6 | 230.7 | 168.5 | 158.7 | 236.3 |
| FRIABILITY | | | | | | | |
| INITIAL | | ** | NONE | NONE | NONE | NONE | NONE |
| 24 HR. | | ** | NONE | NONE | NONE | NONE | NONE |
| SHRINKAGE | | ** | SLIGHT | NONE | NONE | NONE | NONE |
| #10 LILY CUP, PCF | | ** | 1.47 | 1.58 | 1.60 | 1.46 | 1.60 |
| CORE, PCF | | ** | 1.20 | 1.42 | 1.49 | 1.47 | 1.44 |
| 10 × 10 × 4 PANEL, PCF | | ** | 2.19 | 2.17 | 2.21 | 2.28 | 2.12 |

| COMPONENTS | OH. NO. | 13 | 14 | 15 | 16 | 17 | 18 |
|---|---|---|---|---|---|---|---|
| POLYOL A | 450 | | | | | | |
| POLYOL B | 390 | | | | | | |
| POLYOL C | 275 | 70 | 50 | 50 | | | |
| POLYOL D | 220 | | | | 100 | 70 | 70 |
| POLYOL E | 300 | | | | | | |
| POLYOL F | 935 | | | 50 | | 30 | |
| POLYOL G | 400 | 30 | 50 | | | | 30 |
| POLYOL H | 240 | | | | | | |
| POLYOL I | 38 | | | | | | |
| POLYOL J | 500 | | | | | | |
| DC-193 | | 1.5 | 1.5 | 1.5 | 1.5 | 1.5 | 1.5 |
| POLYCAT 8 | | 2.3 | 2.3 | 3 | 1.4 | 2.3 | 22 |
| WATER | | 5.62 | 5.82 | 7.96 | 4.88 | 6.60 | 5.31 |
| TOTAL | | 109.42 | 109.62 | 112.46 | 107.78 | 110.40 | 128.81 |
| AVE. OH NO. | | 313 | 338 | 605 | 220 | 435 | 274 |
| INDEX | | 110 | 110 | 110 | 110 | 110 | 110 |
| LUPRANATE M20S | | 173.4 | 183.2 | 288.0 | 137.1 | 221.2 | 158.3 |
| FRIABILITY | | | | | | | |
| INITIAL | | NONE | NONE | NONE | NONE | NONE | NONE |
| 24 HR. | | NONE | NONE | NONE | NONE | NONE | NONE |
| SHRINKAGE | | NONE | NONE | NONE | NONE | NONE | NONE |
| #10 LILY CUP, PCF | | 1.56 | 1.57 | 1.49 | 1.74 | 1.51 | 1.57 |
| CORE, PCF | | 1.42 | 1.43 | 1.38 | 1.50 | 1.37 | 1.44 |
| 10 × 10 × 4 PANEL, PCF | | 2.16 | 2.18 | 2.18 | 2.15 | 2.13 | 2.18 |

| COMPONENTS | OH. NO. | 19 | 20 | 21 | 22 | 23 | 24 |
|---|---|---|---|---|---|---|---|
| POLYOL A | 450 | | | | | | |
| POLYOL B | 390 | | | | | | |
| POLYOL C | 275 | | | 70 | | 40 | |
| POLYOL D | 220 | 50 | 50 | | 70 | | 40 |
| POLYOL E | 300 | | | | | | |
| POLYOL F | 935 | | | | | | |
| POLYOL G | 400 | | 50 | | | | |
| POLYOL H | 240 | 50 | | | | | |
| POLYOL I | 38 | | | | | | |
| POLYOL J | 500 | | | 30 | 30 | 60 | 60 |
| DC-193 | | 1.5 | 1.5 | 1.5 | 1.5 | 1.5 | 1.5 |
| POLYCAT 8 | | 2.3 | 2.5 | 0.8 | 1.1 | 0.65 | 0.7 |
| WATER | | 5.60 | 7.74 | 5.86 | 5.55 | 6.40 | 6.22 |
| TOTAL | | 109.40 | 111.74 | 108.16 | 108.15 | 108.55 | 108.42 |
| AVE. OH NO. | | 310 | 578 | 343 | 304 | 410 | 388 |
| INDEX | | 110 | 110 | 110 | 110 | 110 | 110 |
| LUPRANATE M20S | | 172.4 | 277.2 | 185.1 | 170.0 | 211.6 | 203.0 |
| FRIABILITY | | | | | | | |
| INITIAL | | NONE | NONE | NONE | NONE | NONE | NONE |

TABLE 1-continued

| 24 HR. SHRINKAGE | NONE NONE | NONE NONE | NONE NONE | NONE NONE | NONE NONE | NONE NONE |
|---|---|---|---|---|---|---|
| #10 LILY CUP, PCF | 1.49 | 1.52 | 1.44 | 1.60 | 1.59 | 1.62 |
| CORE, PCF | 1.38 | 1.36 | 1.25 | 1.40 | 1.31 | 1.35 |
| 10 × 10 × 4 PANEL, PCF | 2.13 | 2.07 | 2.13 | 2.16 | 2.16 | 2.15 |

**RESIN SEPARATED WORK DISCONTINUED t,0100

TABLE 2

| PHYSICAL PROPERTIES (PANEL) | 1 | 2 | 3 | 4 | 5 | 6 |
|---|---|---|---|---|---|---|
| DENSITY, CORE | 1.62 | 1.60 | ** | 1.89 | 1.62 | 1.62 |
| FRIABILITY, % | 6.7 | 6.7 | ** | 5.7 | 10.6 | 9.0 |
| DIMENSIONAL STABILITY | | | | | | |
| 158° F./100% RH | | | ** | | | |
| 1 DAY | 1.2 | 0.1 | ** | 1.5 | 0.2 | 0.6 |
| 2 DAYS | 1.2 | 0.3 | ** | 1.5 | 0.0 | 0.4 |
| 7 DAYS | 0.3 | −1.0 | ** | −1.7 | −1.4 | −2.9 |
| 14 DAYS | −1.0 | −2.2 | ** | −3.5 | −2.4 | −4.2 |
| 28 DAYS | −2.5 | −2.7 | ** | −4.5 | −3.3 | −3.7 |
| 200° F./0% RH | | | | | | |
| 1 DAY | 0.5 | −1.4 | ** | −1.5 | −1.2 | −0.7 |
| 2 DAYS | −0.1 | −1.1 | ** | −1.5 | −1.0 | 0.0 |
| 7 DAYS | −0.9 | −1.3 | ** | −2.6 | −1.0 | −0.8 |
| 14 DAYS | −2.2 | −2.1 | ** | −3.8 | −2.0 | −2.5 |
| 28 DAYS | −1.8 | −1.8 | ** | −3.9 | −2.4 | −2.5 |
| 75° F./50% RH | | | | | | |
| 1 DAY | 0.4 | 0.2 | ** | 0.5 | −0.1 | 0.1 |
| 2 DAYS | 1.2 | 0.6 | ** | 1.3 | 0.6 | 1.0 |
| 7 DAYS | 0.5 | 0.0 | ** | 0.4 | 0.4 | −0.3 |
| 14 DAYS | −1.4 | −1.6 | ** | −1.6 | −0.8 | −2.1 |
| 28 DAYS | −1.6 | −2.7 | ** | −2.0 | −1.5 | −2.3 |

| PHYSICAL PROPERTIES (PANEL) | 7 | 8 | 9 | 10 | 11 | 12 |
|---|---|---|---|---|---|---|
| DENSITY, CORE | ** | 1.64 | 1.69 | 1.65 | 1.68 | 1.61 |
| FRIABILITY, % | ** | 11.4 | 12.1 | 12.3 | 2.6 | 7.8 |
| DIMENSIONAL STABILITY | | | | | | |
| 158° F./100% RH | ** | | | | | |
| 1 DAY | ** | 1.6 | 0.5 | −5.7 | −0.7 | 0.9 |
| 2 DAYS | ** | 1.8 | 0.5 | −16.3 | −0.3 | 0.6 |
| 7 DAYS | ** | −0.2 | −2.8 | −16.5 | −1.3 | −0.7 |
| 14 DAYS | ** | −2.7 | −3.7 | −16.1 | −1.7 | −2.7 |
| 28 DAYS | ** | −2.0 | −4.3 | −16.3 | −2.6 | −3.4 |
| 200° F./0% RH | | | | | | |
| 1 DAY | ** | −0.9 | −2.1 | −12.0 | −1.4 | −0.8 |
| 2 DAYS | ** | −0.8 | −1.9 | −6.8 | −0.8 | −0.8 |
| 7 DAYS | ** | −1.0 | −2.0 | −10.3 | −1.4 | −0.7 |
| 14 DAYS | ** | −2.8 | −3.9 | −9.8 | −3.1 | −2.2 |
| 28 DAYS | ** | −3.3 | −4.4 | −8.7 | −2.8 | −2.2 |
| 75° F./50% RH | | | | | | |
| 1 DAY | ** | 0.3 | 0.5 | 0.4 | −0.4 | 1.1 |
| 2 DAYS | ** | 1.0 | 1.5 | 1.1 | 0.8 | 1.4 |
| 7 DAYS | ** | 0.7 | 1.2 | 0.8 | −0.1 | −0.6 |
| 14 DAYS | ** | −0.1 | 0.7 | −0.5 | −1.4 | −1.4 |
| 28 DAYS | ** | −1.1 | −2.0 | −1.3 | −2.0 | −1.9 |

| PHYSICAL PROPERTIES (PANEL) | 13 | 14 | 15 | 16 | 17 | 18 |
|---|---|---|---|---|---|---|
| DENSITY, CORE | 1.63 | 1.65 | 1.71 | 1.66 | 1.72 | 1.59 |
| FRIABILITY, % | 3.2 | 2.4 | 9.3 | 0.0 | 3.7 | 0.6 |
| DIMENSIONAL STABILITY | | | | | | |
| 158° F./100% RH | | | | | | |
| 1 DAY | 1.1 | −0.2 | 0.3 | −33.5 | 0.6 | −46.2 |
| 2 DAYS | −0.1 | −0.8 | 0.7 | −35.4 | −0.3 | −42.3 |
| 7 DAYS | −3.2 | −2.8 | −2.8 | −34.4 | −1.6 | −40.2 |
| 14 DAYS | −4.2 | −5.1 | −3.5 | −35.0 | −2.9 | −37.2 |
| 28 DAYS | −4.6 | −4.6 | −3.7 | −36.6 | −2.8 | −40.7 |
| 200° F./0% RH | | | | | | |
| 1 DAY | −2.0 | −1.7 | −0.1 | −38.7 | −1.6 | −43.9 |

TABLE 2-continued

| PHYSICAL PROPERTIES (PANEL) | | | | | | |
|---|---|---|---|---|---|---|
| 2 DAYS | −1.8 | −1.0 | 0.0 | −36.6 | −1.6 | −41.3 |
| 7 DAYS | −2.0 | −1.0 | −0.2 | −33.2 | −1.3 | −39.2 |
| 14 DAYS | −3.4 | −2.6 | −1.4 | −37.4 | −2.1 | −40.9 |
| 28 DAYS | −3.3 | −2.9 | −1.8 | −38.8 | −2.5 | −46.3 |
| 75° F./50% RH | | | | | | |
| 1 DAY | 0.1 | 0.2 | 0.1 | 0.1 | 0.5 | −0.1 |
| 2 DAYS | 0.7 | 0.4 | 1.1 | 0.9 | 0.8 | 0.3 |
| 7 DAYS | 0.0 | −0.6 | −0.4 | −13.8 | 0.1 | −0.2 |
| 14 DAYS | −1.5 | −1.5 | −1.0 | −17.4 | −1.3 | −2.2 |
| 28 DAYS | −2.5 | −2.0 | −1.9 | −21.0 | −2.5 | −3.9 |
| PHYSICAL PROPERTIES (PANEL) | 19 | 20 | 21 | 22 | 23 | 24 |
| DENSITY, CORE | 1.64 | 1.73 | 1.60 | 1.74 | 1.71 | 1.74 |
| FRIABILITY, % | 2.0 | 7.6 | 1.1 | 0.3 | 3.1 | 2.8 |
| DIMENSIONAL STABILITY | | | | | | |
| 158° F./100% RH | | | | | | |
| 1 DAY | −1.5 | 0.9 | 0.5 | −1.5 | 0.5 | 0.9 |
| 2 DAYS | −10.3 | 0.9 | 0.1 | −17.1 | 0.2 | −5.4 |
| 7 DAYS | −14.7 | −1.3 | −9.2 | −27.8 | −3.8 | −19.0 |
| 14 DAYS | −15.8 | −2.5 | −11.2 | −27.9 | −5.9 | −19.3 |
| 28 DAYS | −26.5 | −2.6 | −11.3 | −25.9 | −6.5 | −19.4 |
| 200° F./0% RH | | | | | | |
| 1 DAY | −2.4 | −1.1 | −2.5 | −14.7 | −1.5 | −5.4 |
| 2 DAYS | −2.7 | −0.9 | −2.4 | −19.8 | −5.4 | −11.9 |
| 7 DAYS | −4.5 | −1.2 | −6.0 | −19.8 | −12.1 | −12.0 |
| 14 DAYS | −5.6 | −2.2 | −7.4 | −20.2 | −13.0 | −12.9 |
| 28 DAYS | −6.1 | −2.6 | −7.1 | −20.6 | −14.0 | −13.5 |
| 75° F./50% RH | | | | | | |
| 1 DAY | −0.4 | −0.4 | 0.0 | 0.0 | −0.2 | 0.2 |
| 2 DAYS | 0.6 | 0.5 | 1.0 | 0.8 | 0.6 | 0.9 |
| 7 DAYS | 0.2 | 0.0 | −0.3 | 0.9 | −1.1 | −0.7 |
| 14 DAYS | −1.8 | −1.1 | −1.4 | −1.3 | −2.5 | −2.8 |
| 28 DAYS | −2.9 | −1.1 | −2.6 | −1.8 | −3.1 | −3.3 |

RH = RELATIVE HUMIDITY

All polyol combinations, except those using Polyol A, showed an improvement in the initial surface friability of the foam over the Polyol A/G blend.

The tumbling friability of the Polyol A/G blend is approximately 6 weight percent. The foams made using TDA polyols Polyol B and Polyol E gave higher (poorer) tumbling friability values in range from 9 to 13 weight percent loss. Foams made using the Polyols C and D generally gave very low (good) tumbling friabilities ranging from ~0 to 9 weight percent loss. The triol polyols, except for Polyol F, did not affect the friability of the foams. Increasing the Polyol F level in a foam with low friability increased the tumbling friability while increasing the Polyol F level in a foam with higher friability, like a Polyol E-containing foam, had little or no effect on friability.

All the foams in this study, except for Example 16, had very good room temperature dimensional stability. Foam of Example 1 which had poor dimensional stability was made using experimental Polyol D as the sole polyol. Polyol D is a TDA-initiated, all-propylene oxide polyol with a hydroxyl number of 220. For this foam series, the results of the 158° F./100 percent RH and 200° F. oven dimensional stability tests were very similar. At 158° F./100 percent RH, the formulations were generally stable, except for foams made using Polyol E or D alone or the Polyol D/E blend. Foams containing Polyol J (a triol) above 10 weight percent also had poor dimensional stability. All foam formulations utilizing Polyol C gave foams with a combination of good physical properties at low densities with lower isocyanate consumption.

Having thus described the invention, we claim:

1. A low density, substantially closed-cell, water-blown, rigid polyurethane foam comprising:
   A. A polymethylene polyphenylpolyisocyanate,
   B. a polyol blend, consisting essentially of:
      1) from 40 weight percent to 100 weight percent, based on the total weight of the polyol blend, of a toluenediamine initiated polyether polyol with a hydroxyl number from about 220 to about 390, and
      2) from 60 weight percent to 0 weight percent, based on the total weight of the polyol blend, of a polyether polyol having an average functionality of about 3 and a hydroxyl number of from 230 to about 1,000,
   C. a catalyst capable of promoting urethane formations,
   D. a surfactant,
   E. water in an amount sufficient to act as a blowing agent, and,
   F. optionally dyes, fillers, antioxidants, flame retardants and stabilizers,
   wherein said foam exhibits no initial friability, less than 9 weight percent tumbling friability, and less than about 10 percent total loss of volume after 28 days at 158° F./100 percent relative humidity.

2. A polyurethane foam as claimed in claim 1, comprising from 40 weight percent to 100 weight percent of a toluenediamine initiated polyoxypropylene glycol having a hydroxyl number of 275.

3. A polyurethane foam as claimed in claim 1, comprising 100 weight percent of a toluenediamine initiated polyoxypropylene polymer having a hydroxyl number of 275.

4. A polyurethane foam as claimed in claim 1, comprising from 60 weight percent to 0 weight percent of a glycerine initiated polyoxypropylene polymer having a hydroxyl number from about 230 to about 1,000.

5. A polyurethane foam as claimed in claim 1, wherein the toluenediamine initiated polyoxypropylene polymer having a hydroxyl number of 275 is present in amounts of 50 weight percent to 70 weight percent, and a glycerine initiated polyoxypropylene polymer having a hydroxyl number of 400 is present in amounts of from 50 weight percent to 30 weight percent.

* * * * *